United States Patent
Cohen et al.

(10) Patent No.: US 6,463,265 B1
(45) Date of Patent: Oct. 8, 2002

(54) DATA SOURCE HAND-OFF IN A BROADCAST-BASED DATA DISSEMINATION ENVIRONMENT

(75) Inventors: Norman H. Cohen, Suffern, NY (US); Apratim Purakayastha, Yorktown Heights, NY (US); Luke Wong, Norwood, NJ (US); Danny L. Yeh, Mt. Vernon, NY (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/874,095

(22) Filed: Jun. 5, 2001

(51) Int. Cl.$^7$ ................................................ H04Q 7/20
(52) U.S. Cl. ................................ 455/186.1; 455/152.1; 455/436
(58) Field of Search ........................ 455/152.1, 158.1, 455/186.1, 45, 134, 161.1, 161.2, 161.3, 150.1, 185.1, 188.1, 188.2, 194.2, 434, 436, 439

(56) References Cited

U.S. PATENT DOCUMENTS

| | | | | |
|---|---|---|---|---|
| 4,969,209 A | * | 11/1990 | Schwob | 455/158.5 |
| 5,220,682 A | * | 6/1993 | Tomohiro | 455/161.2 |
| 5,345,602 A | * | 9/1994 | Wiedemann et al. | 455/137 |
| 5,390,343 A | * | 2/1995 | Rupprecht et al. | 455/161.3 |
| 5,537,674 A | * | 7/1996 | Kishimoto et al. | 455/158.5 |
| 5,577,048 A | * | 11/1996 | Kasa | 370/522 |
| 5,610,821 A | | 3/1997 | Gazis et al. | 364/444.2 |
| 5,654,719 A | * | 8/1997 | Kunii | 342/451 |
| 5,734,973 A | * | 3/1998 | Honda | 455/184.1 |
| 5,745,845 A | * | 4/1998 | Suenaga et al. | 455/186.1 |
| 5,806,018 A | | 9/1998 | Smith et al. | 701/211 |
| 5,819,166 A | * | 10/1998 | Kimura et al. | 455/184.1 |
| 6,112,063 A | * | 8/2000 | Ravi et al. | 455/186.1 |
| 6,141,536 A | * | 10/2000 | Cvetkovic et al. | 455/134 |
| 6,219,385 B1 | * | 4/2001 | Weinberg | 342/463 |
| 6,282,412 B1 | * | 8/2001 | Lyon | 455/186.1 |
| 6,282,491 B1 | * | 8/2001 | Bochmann et al. | 342/357.09 |

FOREIGN PATENT DOCUMENTS

GB     2240679     * 8/1991

OTHER PUBLICATIONS

"MarconiNet–Next Generation Internet Radio Network", http://www.cs.columbia.edu/–marconi.html, 5 pages.

* cited by examiner

Primary Examiner—Nay Maung
Assistant Examiner—Jean A Gelin
(74) Attorney, Agent, or Firm—Ido Tuchman; Robert P. Tassinari, Jr.

(57) ABSTRACT

A method, system, and apparatus for handing-off data receivers in a broadcast-based data dissemination environment. Data receiver hand-off is carried out between data sources in different data cells broadcasting information of the same category. Furthermore, data cell ranges are based on geographic regions rather than signal strength coverage. Generally, the hand-off process involves acquiring the current receiver location of the data receiver and comparing the receiver location with a current data cell range. If the current receiver location is outside the current data cell range, a hand-off controller searches for a new data source encompassing the current receiver location coordinates and having an associated data topic matching the current topic. Once a new data source is found, the hand-off controller subscribes the data receiver to the new data source.

36 Claims, 7 Drawing Sheets

DATA SOURCE HAND-OFF IN A BROADCAST-BASED DATA DISSEMINATION ENVIRONMENT

FIELD OF THE INVENTION

The present invention relates to information dissemination systems, and more specifically to data source hand-off in broadcast-based data dissemination environments.

BACKGROUND

Nearly everyone uses broadcast-based information systems to receive information and entertainment in their day-to-day lives. For example, radio and television stations broadcast music, pictures, and news programs across the country to radios and television sets. Broadcast-based systems are typically characterized by a single data source disseminating information to many data receivers. Unlike many request-response type information systems, information in a broadcast-based system, in general, travels in one direction from a data source to a data receiver. In other words, the data source of a broadcast-based information system does not wait for a response from the data receiver before sending more information.

The "one-way" path of information from the data source to the data receiver of a broadcast-based system enables information to be sent to many subscribers in a relatively quick and inexpensive manner. Although this attribute enables efficient transfer of information, subscribers within the system give up the flexibility of choosing the arrival time and the individual content delivered over the broadcast channel. Because of this tradeoff between efficiency and flexibility, broadcast systems are generally arranged to provide different data on different data channels to meet the varied needs and preferences of its audience. For instance, many radio stations focus their broadcast on a specific area of interest, such as news, sports, or country music. Depending on individual tastes and interests, radio listeners choose the type of program to receive by tuning their radio receivers to their preferred stations. Thus, radio listeners do not have direct control over the content of each data channel, only the freedom to choose another data channel to listen to.

In general, data signals of traditional broadcast-based information systems have a limited geographic broadcast range. When a subscriber travels beyond the data signal's broadcast range, a new data source covering the local geographic area must be selected in order to maintain data reception. Moreover, if a subscriber wishes to continue receiving similar data content, the broadcast system must be searched to find a local data source providing such content. For example, if a radio tuned to a country radio station moves too far from the radio station, the signal will become too weak and a new radio station must be selected to maintain radio reception. Furthermore, if the listener wishes to continue listening to a country station, he or she may have to search the radio band to find another country station. Thus, a shortcoming of traditional broadcast-based information systems is the difficulty in receiving consistent data from one geographic region to another.

One known method of continuously carrying on a communication link from region to region is called hand-off. Hand-off is typically associated with cellular telephone communication. A cellular telephone network typically divides a geographic area into a cellular grid. A base station controls telephone communications within each cell in the grid, and wireless phones within a cell transmit and receive data to and from the cell's base station. When a wireless phone physically crosses a cell boundary and moves to a new cell in the grid, the base station in the old cell disconnects from the phone and a base station in the new cell takes over communications with the phone. This process is referred to as "handing-off" and, if all goes well, occurs without the phone user ever knowing that it is happening. To the user, the phone call appears as a continuous connection to the party at the other end of the line.

The type of hand-off described above is generally referred to as a horizontal hand-off. Another type of communication hand-off called vertical hand-off has emerged in recent years. The concept of vertical hand-off is similar to horizontal hand-off, except that communication cells are configured to overlap on top of each other, as opposed to being placed adjacent to each other. Typically, a small cell is used to cover the area of buildings, and a larger overlapping umbrella cell is used to cover the distances between buildings. When a mobile user enters or leaves a building, the connection between the user's wireless phone is switched over to the area's base station without dropping the voice conversation.

Another drawback of traditional broadcasting-based information systems is their inability to provide specific information tailored to the particular area around the listener's location. Returning to the example of a radio listener traveling across a broadcast area, the listener may be interested in listening to advertising or traffic conditions within ten square blocks of his or her location. With current radio broadcasting methods, the listener must listen to all information broadcast by the radio station, no matter how irrelevant it is to the listener.

SUMMARY OF THE INVENTION

The present invention addresses the above-mentioned limitations of traditional broadcast-based data dissemination systems by teaching a method, system, and apparatus for handing-off data receivers in a broadcast-based environment. Data receiver hand-off is carried out between data sources in different data cells broadcasting information of the same category. Furthermore, data cell ranges are based on geographic regions rather than signal strength coverage. Briefly stated, the hand-off process involves acquiring the current receiver location of the data receiver and comparing the receiver location with a current data cell range. If the current receiver location is outside the current data cell range, a hand-off controller searches for a new data source encompassing the current receiver location coordinates and having an associated data topic matching the current topic. Once a new data source is found, the hand-off controller subscribes the data receiver to the new data source.

Thus, an aspect of the present invention involves a method for delivering data streams categorized by topic to at least one data receiver in a broadcast-based data dissemination environment. The method includes defining a first data cell range based on a first geographic region and defining a second data cell range based on a second geographic region. A subscribing step subscribes the data receiver to a first data source when the data receiver is located at a first receiver position within the first data cell range. The first data source broadcasts a first data stream across a first data channel, and a topic categorizes the first data stream. A detecting step detects when the data receiver is located at a second receiver position outside the first data cell range and within the second data cell range. Another subscribing step subscribes the data receiver to a second data source when the data receiver is located at the second receiver position. The second data source broadcasts a second data stream across a second data channel, with the second data stream having the same topic subject as the first data stream.

Another aspect of the invention is a broadcast-based data dissemination system. The system includes a first data source having an associated first data cell range. The first data cell range is defined by a first geographic region and is associated to a first data topic. The first data source is further configured to broadcast a first data stream across a first data channel. The system additionally includes a data receiver having a current receiver location and subscribing to the first data source. A second data cell range defined by a second geographic region is associated to a second data source. The second data source is also associated to a second data topic matching the first data topic and is configured to broadcast a second data stream across a second data channel. A hand-off controller is configured to subscribe the data receiver to the second data source if the current receiver position changes from the first data cell range to the second data cell range.

Another aspect of the invention is a data structure stored in a computer-readable medium. The data structure includes a primary data source identifier field identifying data sources within a broadcast-based data dissemination environment. A data cell range field is coupled to the data source identifier field and describes geographical ranges of data cells controlled by the data sources. A communication link field is also coupled to the data source identifier field and describes data channels for receiving data streams from the data sources.

The data structure may further include a topics field which identifies data sources broadcasting data with a common topic. Furthermore, the data structure may be configured with a data receiver identifier field, a location information field, and a secondary data source identifier field. The data receiver identifier field identifies data receivers within the broadcast-based data dissemination environment. The location information field is coupled to the data receiver identifier field, and describes geographical locations of the data receivers. Finally, the secondary data source identifier field is also coupled to the location information field and identifies data sources subscribed to by the data receivers.

Another implementation of the present invention is a method for handing-off a data receiver to a data source in a broadcast-based data dissemination environment. The data receiver is positioned at a current receiver location and receives a current data stream from a current data source. The current data source has a current topic and a current data cell range, with a geographic region defining the current data cell range. The method includes acquiring the current receiver location of the data receiver. A comparing step compares the current receiver location with the current data cell range. If the current receiver location is outside the current data cell range, a searching step searches for a new data source having an associated new data cell range encompassing the current location coordinates and an associated data topic matching the current topic. A subscribing step then subscribes the data receiver to the new data source.

Yet another aspect of the invention is a data receiver configured to present a data stream from a data source in a broadcast-based data dissemination environment to a user. The data receiver includes a position sensor configured to sense the current geographical location of the data receiver. A broadcast receiver is configured to receive a current data stream from a current data source. The current data source has a current topic and a current data cell range, with the current data cell range defined by a current geographic region. The data receiver also includes a data source table identifying data sources, data cell ranges, and data channels within the broadcast-based data dissemination environment. In addition, a hand-off controller configured to subscribe the data receiver to a new data source listed in the data source table is used when the current geographical location of the data receiver falls outside the current data cell range. The new data source has an associated new data cell range encompassing the current geographical location of the data receiver and an associated data topic matching the current topic.

The foregoing and other features, utilities and advantages of the invention will be apparent from the following more particular description of various embodiments of the invention as illustrated in the accompanying drawings.

DETAILED DESCRIPTION OF THE INVENTION

Figure 1:
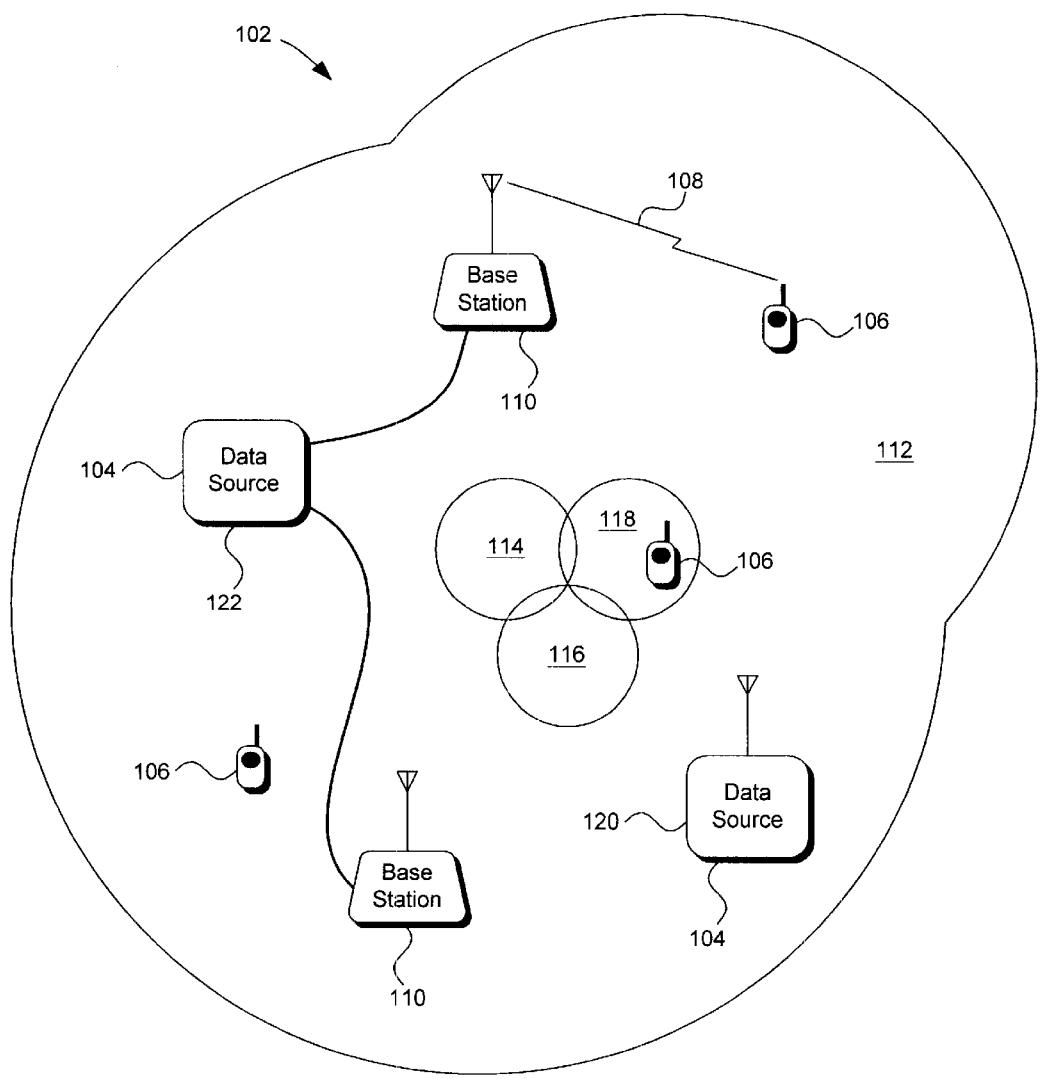
FIG. 1 shows an example of a suitable broadcast-based data dissemination environment in which the invention may be implemented.

The invention is described in detail below with reference to FIGS. 1–7. When referring to the figures, like structures and elements shown throughout are indicated with like reference numerals.

FIG. 1 illustrates an example of a suitable broadcast-based data dissemination environment 102 in which the invention may be implemented. It should be mentioned that the depicted broadcast-based data dissemination environment 102 is only one example of a suitable environment of the present invention and is not intended to suggest any limitation as to the scope of use or functionality of the invention. The present invention may utilize various broadcast-based data dissemination systems, environments, and/or configurations, including, but not limited to, radio, television, and satellite networks, digital radio systems, broadcast disk systems, publish/subscribe systems, Internet-based broadcasting systems, and the like.

The environment 102 contains data sources 104 and data receivers 106. Each data source 104 is configured to broadcast information of common interest to receivers 106 that subscribe to the data source 104. As used herein, the term "subscribe" encompasses connecting, logging on, tuning, demodulating, decoding, and/or other known broadcast-based data reception methods used by data receivers 106. Thus, all data receivers 106 that subscribe to the same data source 104 receive the same categorized information at the same time.

Typically, each data source 104 is uniquely identifiable within the environment 102. A data source 104 may be identified by a network address, a station name, a carrier frequency, or other distinct designation. For example, a data source 104 providing local traffic conditions may be identified by a broadcast carrier frequency, such as 88 MHz, or an Internet Protocol (IP) address, such as 128.128.80.

Communication from a data source 104 to data receivers 106 is effectuated over a data channel 108. A data channel 108 may be a wired connection from a data source 104 to data receivers 106, a wireless connection from a data source 104 to data receivers 106, or a combination thereof. As an example, a data channel 108 may consist of a wired network of base stations 110 transmitting content to wireless data receivers 106. The transmitted content can include various forms of data (i.e., text, audio, or video data), as well as control signals, (i.e., receiver instructions).

A data cell 112 is defined as a geographical region in which a data source 104 provides valid data. Data cells 112 may partially or completely overlap one another. For example, in FIG. 1, data cell 114 is completely overlapped by data cell 112, and is partially overlapped by data cells 116 and 118. Furthermore, a data cell's boundary is drawn arbitrarily over a geographic region, and is not limited by the signal strength of any individual base station 110 or data source 104. Thus, unlike conventional wireless communication systems, a data cell 112 of the present invention may be larger or smaller than traditional wireless cells. For instance, a data cell 112 may span many. conventional wireless cells and a conventional wireless cell may encompass multiple data cells 112. Therefore, rather than using signal strength as the determining factor of cell boundary, the present invention uses geographic location as the determining factor of a cell boundary. In other words, a data cell's boundary is dependent on geographic location, not signal strength.

Each data cell 112 is owned by a data source 104. As discussed in detail below, when a data receiver 106 enters a new data cell, a hand-off controller (not shown in FIG. 1) determines if the data receiver 106 should begin receiving data from the new data cell's owner. For instance, if data cell 114 is owned by data source 120 and a data receiver 106 enters data cell 114, a hand-off controller decides whether the data receiver 106 should switch data channels 108 and begin receiving content from data source 120.

Figure 2:
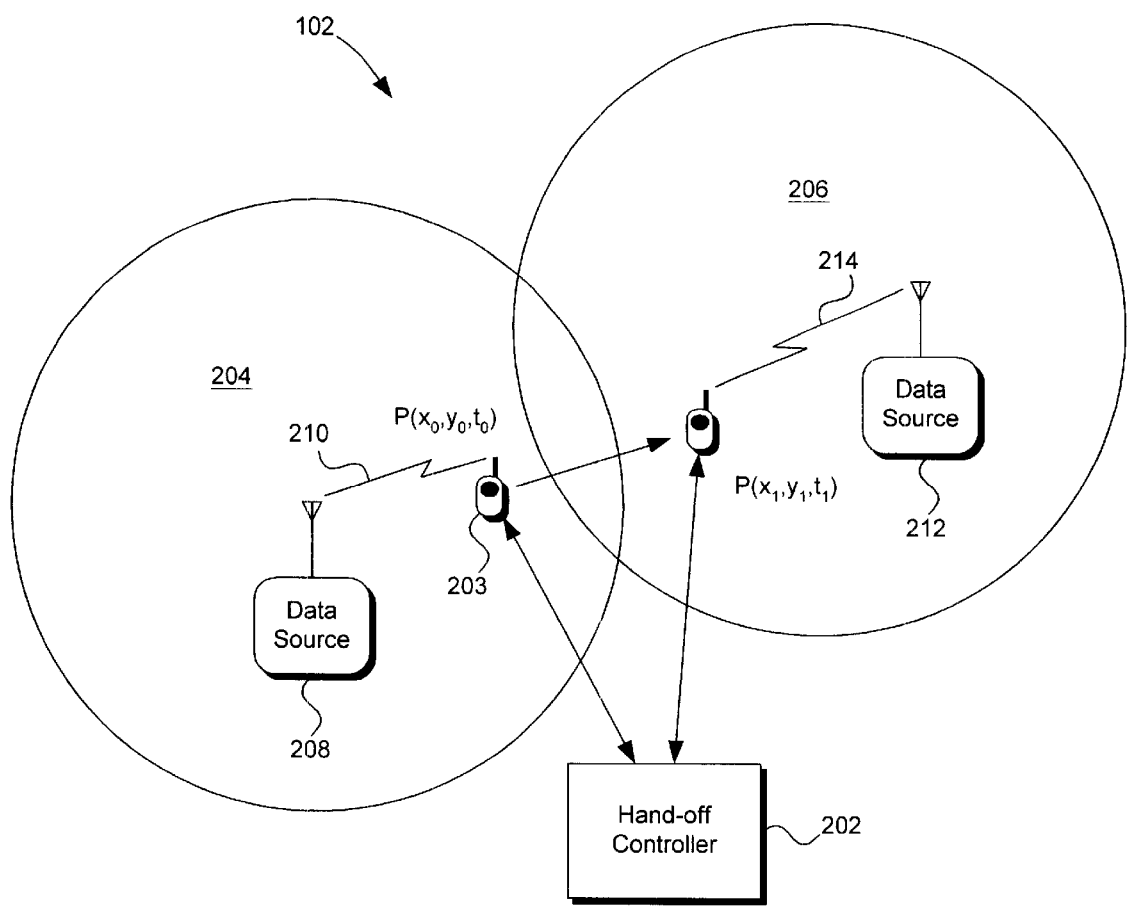
FIG. 2 shows the broadcast-based data dissemination environment with a hand-off controller.

In FIG. 2, the broadcast-based data dissemination environment 102 is shown with a hand-off controller 202. As mentioned above, the hand-off controller 202 is used to determine whether the data receiver 106 should switch data channels 108 and begin communicating with a new data source 104 when a data cell 112 is entered or exited.

As depicted in FIG. 2, a data receiver 203 in data cell 204 is traveling toward data cell 206 at time $t_0$. Furthermore, at time $t_0$, the data receiver 203 is subscribing to data source 208 on data channel 210 and is located at geographic position $(x_0, y_0)$. At a later time $t_1$, the data receiver 203 has moved to geographic position $(x_1, y_1)$ within data cell 206 and is subscribing to data source 212 on data channel 214. This process of switching the data receiver 203 from data source 208 to data source 212 is referred to herein as a hand-off process or as handing-off, and is coordinated by the hand-off controller 202.

Hand-off occurs when a data receiver subscribing to a data source moves outside the data cell belonging to the data source and/or into a new data cell belonging to a new data source broadcasting data with the same topic. For example, assume that both data source 208 and data source 212 are broadcasting local traffic information. Also assume that each data cell 204 and data cell 206 belonging to data source 208 and data source 212 respectively encompasses ten city blocks. When the data receiver 203 subscribing to "local traffic" moves beyond data cell 204, then, by definition, data from data source 208 is no longer valid. The hand-off controller 202 must search for a new data source broadcasting "local traffic" with a data cell range that includes the data receiver's new location. Since data source 212 meets these requirements, the hand-off controller 202 hands-off data receiver 203 to data source 212.

Thus, the hand-off process of the present invention beneficially relieves users from the tasks of disconnecting data receivers from an old data source with invalid data, searching for a new data source with similar data, and connecting to the new data source in a broadcast-based data dissemination environment. In addition, the invention provides a hand-off process which automatically performs these tasks in a fast and seamless manner. As such, the present invention preserves the efficiency of broadcast environments while making such environments more convenient to use.

The hand-off process itself begins when the data receiver 203 provides the hand-off controller 202 its spatial coordinates. The spatial coordinates used can be derived from a variety of location determination techniques and technologies, such as, but not limited to, cell/sector, microcell, global positioning satellites (GPS), time difference or arrival (TDOA), angle of arrival (AOA), and hybrid location methods and technologies known to those skilled in the art. In addition, the data receiver 203 may prompt the user for location information. When the hand-off controller 202 detects that the data receiver 203 is about to leave the current data cell 204 and. enter a new data cell 206, it opens a new data channel 214 to the new data source 212. Once the data receiver 203 reaches the new data cell 206, the hand-off controller 202 disconnects the data receiver 203 from the previous data channel 210 and connects it to the new data channel 214.

It is contemplated that the spatial coordinates of the data receiver may be user configurable to values other than the receiver's current location. For example, a user may be interested in local advertisements from a particular location, regardless of the present location of the data receiver. In such a case, the data receiver may be subscribed to a "local advertising" data channel and the coordinates of the data receiver could be fixed to the location of interest. In a further embodiment of the invention, the data receiver may be programmed to automatically choose from a list of coordinates the coordinate closest to the actual location of the receiver.

In a particular embodiment of the invention, a position offset may be added to the spatial coordinates of the data receiver. For example, a user traveling east and subscribing to "local traffic" may be interested in traffic conditions five miles ahead of his or her present location. Thus, the user can specify a five-mile eastern position offset from the present location and receive traffic information from data cells in advance of the current position. It is additionally contemplated that the position offset value may be based on the on the travel velocity of the data receiver and/or user's historical travel patterns.

Figure 3:
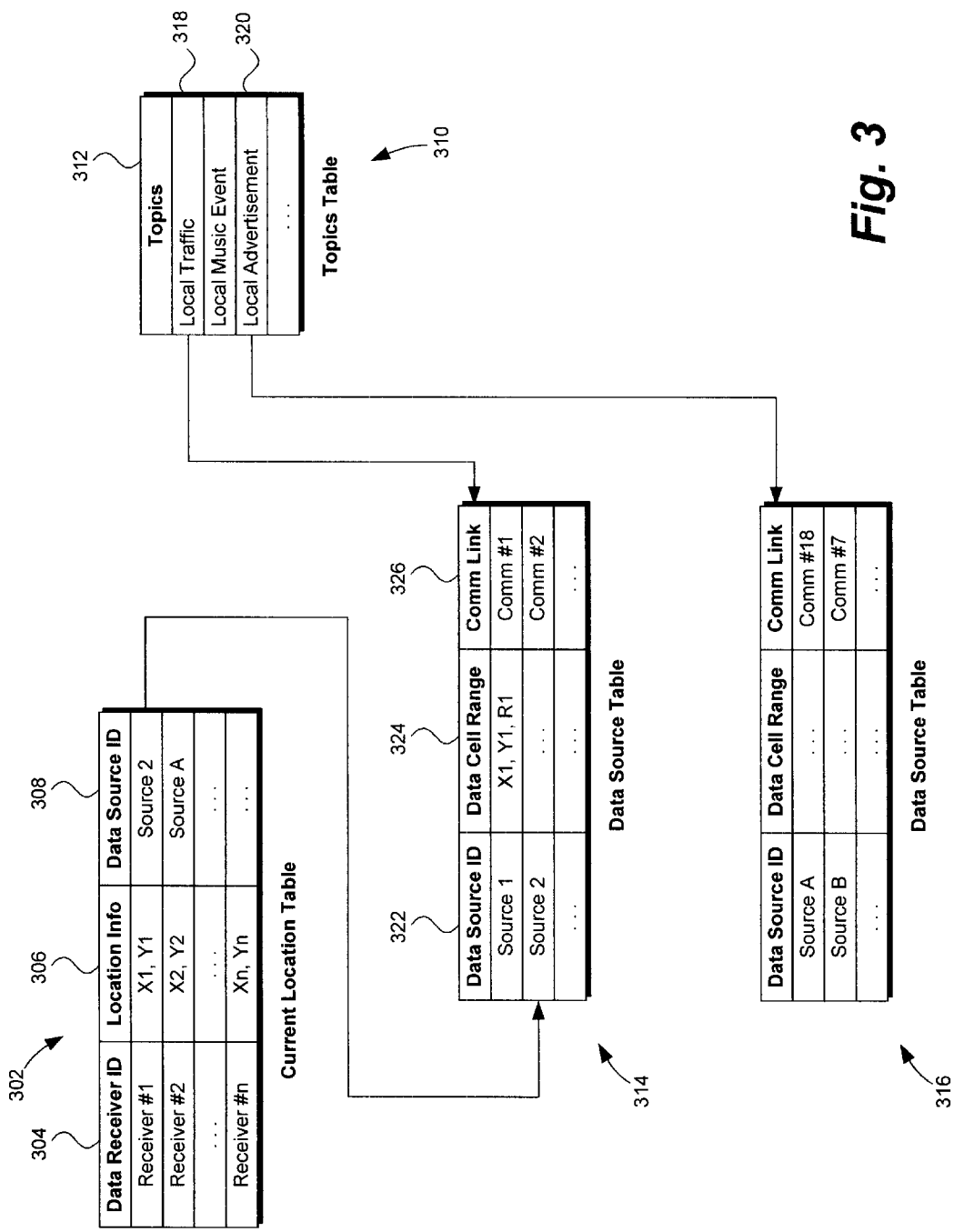
FIG. 3 shows exemplary data structures used by the hand-off controller to perform a hand-off process.

In FIG. 3, exemplary data structures used by a hand-off controller to perform the hand-off process are shown. The data structures include a current location table 302 that stores each data receiver's identity and current spatial coordinates in a data receiver identification field 304 and a location information field 306 respectively. Generally, the current location table 302 is used when the data structures reside in a hand-off controller 202 managing multiple data receivers. The location information field 306 is continuously updated as new receiver location coordinates are provided to the hand-off controller. Additionally, the current location table 302 provides a current data source identification field 308 which identifies the data source each data receiver is subscribing to.

A topics table 310 includes a topics field 312 containing a list of categorized subjects available to the data receivers in the broadcast-based environment. Each topic entry is associated with a particular data source table 314. For example, the "local traffic" topic entry 318 references data source table 314 and the "local advertisement" topic entry 320 references another data source table 316.

Each data source table 314 contains a data source identification field 322. The data source identification field 322 lists data sources broadcasting the topic referenced in the topics table 310. Each data source identification field entry has a corresponding data cell range entry in the data cell range field 324. The data cell range field 324 describes the boundary coordinates of the data cell associated with the data source. In a particular embodiment of the invention, the cell range is expressed as an X-coordinate, a Y-coordinate, and a circle radius. It is contemplated that other representations of the data cell range may be used for the data cell. Each data source listed in the data source table 314 is also associated with a communication link field 326 describing the communication mechanism by which a data receiver communicates with the data source. The communication link field 326, for example, may contain the carrier frequency or the computer network address for the corresponding data source in the data source identification field 322. It is contemplated that multiple data sources may share the same communication mechanism.

In accordance with the present invention, the data structures described above can be any available media that can be accessed by the hand-off controller. In a particular embodiment of the invention, the data structures are embodied as computer readable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the hand-off controller. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

Figure 4:
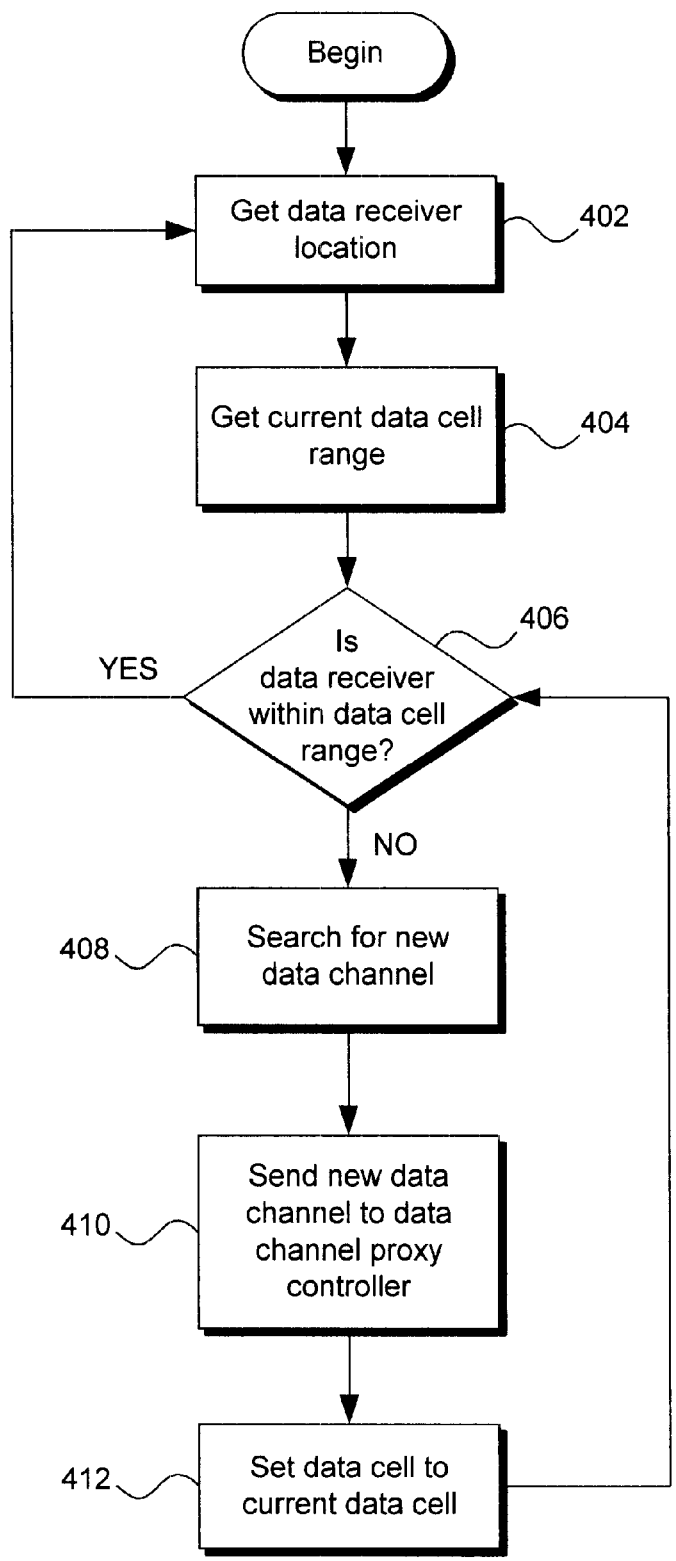
FIG. 4 shows a flow chart of an exemplary data channel hand-off algorithm.

In FIG. 4, a flow chart of an exemplary data channel hand-off algorithm is shown. The logical operations of the algorithm are implemented (1) as a sequence of computer implemented steps running on a computing system and/or (2) as interconnected machine modules within the computing system. The implementation is a matter of choice dependent on the performance requirements of the system implementing the invention. Accordingly, the logical operations making up the embodiments of the present invention described herein are referred to alternatively as operations, steps, or modules.

In receiver location operation 402, the current location of the data receiver is obtained. The receiver position may be obtained by searching the current location table 302, as discussed above. Alternatively, the receiver position may be obtained by querying the data receiver directly. After receiver location operation 402 is completed, control passes to data cell range operation 404.

In data cell range operation 404, the data cell range of the data source subscribed to by the data receiver is obtained. The data cell range operation 404 may be performed by looking up the data cell range information in the data source table 314. Alternatively, a data source may be queried directly by the hand-off controller for its data cell range. Next, control passes to conditional operation 406.

At conditional operation 406, the current location of the data receiver is compared to the current data cell range. If the current location falls within the range of the current data cell, then no hand-off action is taken and, at some later point, control returns to receiver location operation 402. If, however, the receiver's current location falls outside the range of the current data cell, then hand-off is initiated by passing control to searching operation 408.

In searching operation 408, a new data source with the same broadcasted topic and with a data cell range covering the current location of the data receiver is retrieved from the data source table 314. It is contemplated that if no data source is available for the current receiver location, a message to this effect may be presented to the user, and the user may be prompted to choose a new broadcast topic from the topics table 310. In addition, if more than one data source is available for the current receiver location, it is contemplated that the user may be prompted to select one of the available data sources. After the searching operation 408 is completed control passes to sending operation 410.

During sending operation 410, a request to connect to the new data source is sent to a data channel proxy controller. As described below, the data channel proxy controller manages data channel connections between data sources and a data receiver. The new data channel is obtained by referring to the communication link field 326 in the data source table 314. Once the data channel is connected, the receiver subscribes to the data source and data is received. After the sending operation 410 is completed control is passed to setting operation 412.

In setting operation 412, the current location table 302 is updated and the new data source is recorded in the data source identification field 308. Once setting operation 412 completes control is returned to conditional operation 406.

Figure 5:
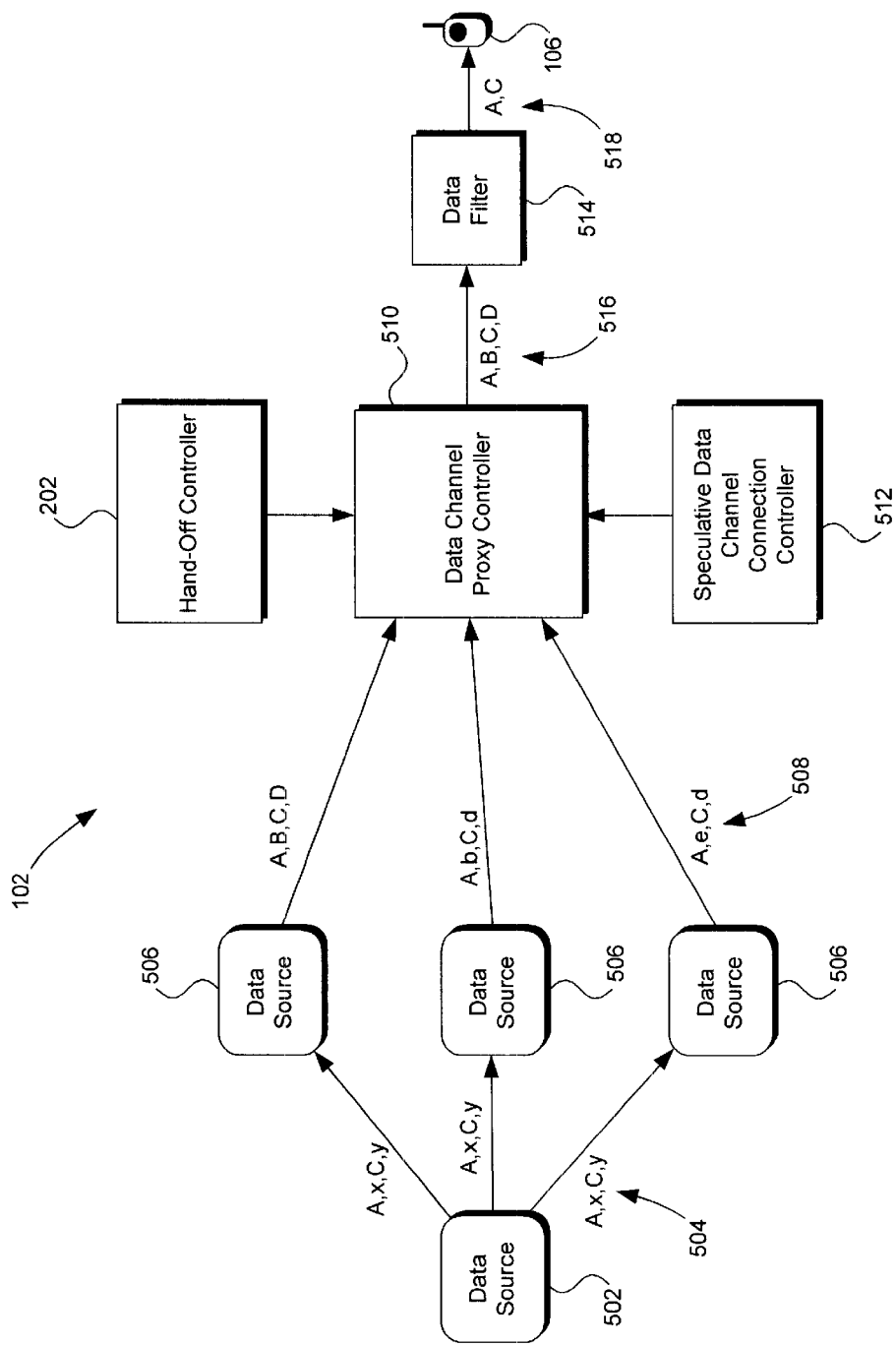
FIG. 5 shows another embodiment of the broadcast-based data dissemination environment contemplated by the present invention.

With reference now to FIG. 5, another embodiment of the broadcast-based data dissemination environment 102 is shown. In this embodiment, data sources are arranged in a tree distribution network, with a parent data source 502 transmitting common data content 504 to other child data sources 506. The child data sources 506 insert or replace data within parts of the common data content. The modified content 508 from the child data sources 506 is then retransmitted (broadcasted) to the data receivers 106. This arrangement is similar to a syndicated radio or television network, where programs are transmitted centrally from a parent station and local broadcast stations insert local content (i.e., advertisements) during commercial breaks.

The data sources 506 are coupled to a data channel proxy controller 510. The data channel proxy controller 510 is used to smoothly switch data sources 506 when hand-off between two data channels is required. As shown, the data channel proxy controller 510 can connect to multiple data sources 506, but only the content of one data source 506 is passed to the data receiver 106. The hand-off controller 202, also coupled to the data channel proxy controller 510, notifies the data channel proxy controller 510 when a data source switch is necessary. During a hand-off process between two data channels, the data channel proxy controller 510-chooses a point in the data streams to switch data sources 508 so that the user does not experience any temporary ill effects caused by switching.

In one embodiment of the present invention, markers or cues are inserted in the data streams of data channels to indicate where in the data stream a data source switch would be appropriate. The data channel proxy controller 510 adds a time delay to one or both of the data streams, thereby synchronizing the markers in time between the two data streams. Once the data streams are aligned, the data channel proxy controller 510 switches the output data channel to the new data source.

A further embodiment of the present invention uses a speculative data channel connection controller 512 to preemptively open data channels in the data channel proxy controller 510 in anticipation of the possibility that a data channel hand-off will be soon occur. In doing so, the speculative data channel connection controller 512 helps reduce the latency costs associated with opening, aligning, and switching data channels during hand-off.

The number of data channels opened by the speculative data channel connection controller 512 may be dependent on the position sampling rate and the velocity of a particular data receiver. When the sampling rate of a data receiver's position is much less than the rate of change in the data receiver's location, there is greater uncertainty about the data receiver's position between location samples. Moreover, the greater the uncertainty about the data receiver's position, the more data channels need to be opened by the data channel proxy controller 510. Thus, there is an inverse relation between the sample rate of the current location and the number of open data channels needed. The higher the sampling rate, the fewer data channels need to be opened, and similarly, there is a direct relation between the velocity and the number of open channels needed. In other words, the more uncertainty there is about the location of a data receiver, the more data channels may need to be opened in anticipation that the data receiver can suddenly appear in a new data cell after the next position sampling. The actual opening of the data channels and management of these data channels is carried out by the data channel proxy controller 510. For this reason, the data channel proxy controller 510 includes multiple input data channels from different data sources 506 and only one output data channel to the data receiver 106.

Figure 7:
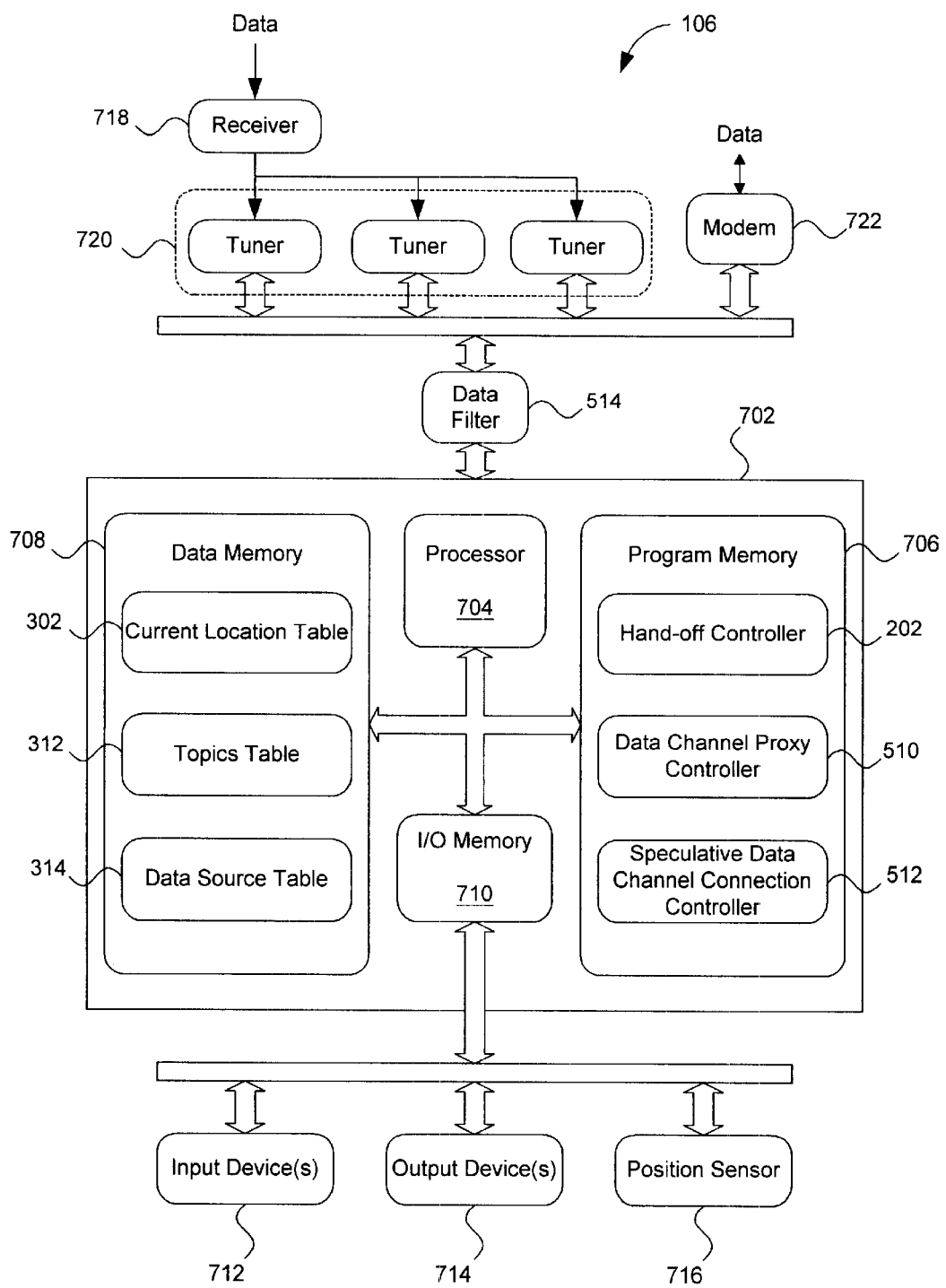
FIG. 7 shows exemplary data receiver contemplated by the present invention.

The present invention may also include a data filter 514 coupled between the data channel proxy controller 510 and the data receiver 106. The data filter 514 is used to selectively filter output data 516 (A,B,C,D) from the data channel proxy controller 510 and passes only a data subset 518 (A,C) to the data receiver 106. In one embodiment of the present invention the data filter 514 is programmable by the hand-off controller 202. This is achieved by the hand-off controller 202 introducing data filer instructions into the output data 516. The data filter 514 detects and decodes these instructions, and filters the output data 516 accordingly. At this point, it should be noted that the data channel proxy controller 510, the speculative data channel connection controller 512, and the data filter 514 may be embodied in either the network infrastructure as shown, or in the data receiver 106 as shown in FIG. 7 and discussed below.

Data filters 514 may be used to create data sub-cells within the broadcast-based data dissemination environment 102. With reference again to FIG. 1, each data cell 112 may include one or more data sub-cells. In such an embodiment, a subscribing data receiver 106 within a data sub-cell may present only a portion of the information broadcasted by the data source 104 to the user. A data sub-cell is owned by the same data source 104 that owns the parent data cell 112, and is located within the data cell 112. For example, assume that data cell 118 is a data sub-cell of data cell 112, and that both data sub-cell 118 and data cell 112 are owned by data source 122. A data receiver 106 moving from data cell 112 to data sub-cell 118 may provide only a subset of the information broadcasted by data source 122 to its user. Thus, when the hand-off controller 202 determines that the data receiver 106 is entering a data sub-cell 118, a control signal is sent to the data filter 514 and only that portion of the data transmitted from the data source 204 pertaining to the data sub-cell 118 is presented to the user.

In one application of such a configuration, a data source 104 may continuously broadcast traffic conditions for the entire geographic region delineated by its data cell 112. Each individual traffic condition is further tagged with control data indicating which data sub-cell or sub-cells are affected by the information. Data receivers 106 within various data sub-cells then display only relevant traffic conditions by filtering out all traffic information from the data source 104 except for traffic information relevant to the data sub-cell 118 they are in. The hand-off controller 202 is used to program the data filters 514 when a data sub-cell 118 is entered or exited.

Figure 6:
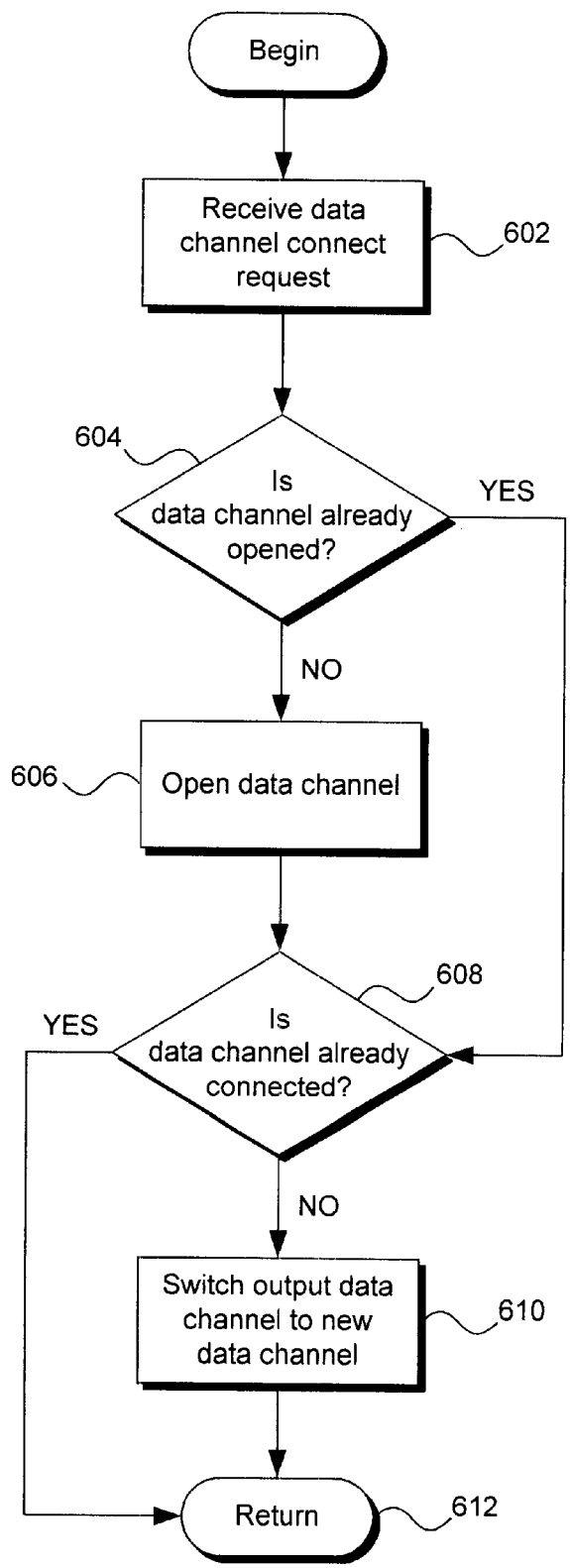
FIG. 6 shows a flow chart of an exemplary algorithm used by the data channel proxy controller to switch data channels.

In FIG. 6, a flow chart of an exemplary algorithm used-by the data channel proxy controller 510 to switch data channels is shown. As before, this algorithm may be implemented (1) as a sequence of computer implemented steps running on a computing system and/or (2) as interconnected machine modules within the computing system. Accordingly, the logical operations making up the embodiments of the present invention described herein are referred to alternatively as operations, steps, or modules.

The algorithm begins with receiving operation 602. During this operation, the data channel proxy controller 510 is instructed to change the data channel being output to the data receiver 106. This instruction is issued by the hand-off controller 202, which determines when the data receiver 106 travels outside the current data cell 112. After the receiving operation 602 is completed, control is passed to conditional operation 604.

In conditional operation 604, the data channel proxy controller 510 determines if the data channel requested is already opened. As discussed above, the data channel proxy controller 510 may open several data channels in anticipation of a hand-off procedure. If the data channel has not been opened, then control is passed to opening operation 606.

In opening operation 606, the data channel is opened by the data channel proxy controller 510. That is, a connection between the data channel and the data channel proxy controller 510 is established. At this point, however, the data is not yet delivered to the data receiver 106. The opening operation 606 may require the execution of various subscription methods mentioned above to establish a connection between the data channel and the data channel proxy controller 510. These methods include, but are not limited to, connecting, tuning, demodulating, decoding, and/or other known broadcast-based data reception methods. After the opening operation 606 is completed, or if the data channel was determined already opened at conditional operation 604, control is passed to decision operation 608.

In decision operation 608, the data channel proxy controller 512 checks if the data channel is being output to the data receiver 106. If the data channel is already being output to the data receiver 106, the data channel proxy controller 510 requires no action and the routine returns to the caller at return operation 612.

If the data channel is not is being output to the data receiver 106, the output is switched to the new data channel in switching operation 610. The switching operation 610 may involve synchronizing old and new data streams, as described above. After the switching operation 610 is completed, the data receiver 106 beings to receive data from the new data channel and the routine returns to the caller at return operation 612.

In FIG. 7, an exemplary data receiver 106 contemplated by the present invention is shown. The data receiver 106 includes a micro controller 702 having a processor 704, program memory 706, data memory 708, and I/O memory 710. The I/O memory 710 is connected to one or more input devices 712 (such as a keyboard, mouse, pen, etc.), one or more output devices 714 (such as a display, speaker, etc.), and a position sensor 716. As mentioned earlier, the position sensor 716 may use a variety of locating techniques and technologies, such as, but not limited to, cell/sector, microcell, global positioning satellites (GPS), time difference or arrival (TDOA), angle of arrival (AOA), and hybrid locating methods and technologies known to those skilled in the art.

The program memory 706 includes computer readable media for executing the hand-off controller module 202, the data channel proxy controller module 510, and the speculative data channel connection controller 512. Furthermore, the data memory 708 includes computer readable media for storing the current location table 302, the topics table 312, and the data source table 314. Depending on the exact configuration of the data receiver 106, the program memory 706 and data memory 708 may be volatile (such as RAM), non-volatile (such as ROM, flash memory, magnetic memory, optical memory, etc.) or some combination of the two.

The data receiver 106 includes a broadcast receiver 718 (such as a satellite dish, RF receiver, microwave receiver, multicast listener, etc.), and one or more tuners 720 which tune to appropriate frequencies or addresses of data sources 104 in the broadcast-based data dissemination environment 102. The tuners 720 may be configured to receive broadcast data in a particularized format, such as MPEG-encoded digital video and audio data, as well as digital data in many different forms, including software programs and programming information in the form of data files. The data receiver 106 may also include a modem 722 which provides wire-based access to the data sources. In other implementations of the data receiver 106, the modem 722 might be replaced by a network card or other type of port/receiver which provides wire-based access to the data sources. The data receiver 106 also includes a data filter 512.

The hand-off controller 202 in the data receiver 106 carries out a hand-off process in much the same manner as discussed above. Using the position sensor 716, the receiver's location is compared to the current data cell range stored in the-data source table 314. If the receiver's location moves outside the current data cell range, the data receiver subscribes to a new data source found in the data source table 314. It is contemplated that information about the broadcast-based environment, such as data entries in the topics table 312 and data source table 314, may be pre-stored in memory or encoded into data streams received by the data receiver 106. The data filter 514 may also be programmed by the hand-off controller 202 using data sub-cell information stored in memory or received in data streams.

The foregoing description of the invention has been presented for purposes of illustration and description. It is not intended to be exhaustive or to limit the invention to the precise form disclosed, and other modifications and variations may be possible in light of the above teachings. The embodiments disclosed were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for delivering data streams categorized by topic to at least one data receiver in a broadcast-based data dissemination environment, the method comprising:

defining a first data cell having a first data cell range, the first data cell created by at least one first base station having a first base station signal range, wherein the first data cell range is different than the first base station signal range;

defining a second data cell having a second data cell range, the second data cell created by at least one second base station having a second base station signal range, wherein the second data cell range is different than the second base station signal range;

subscribing the data receiver to a first data source when the data receiver is located at a first receiver position within the first data cell range, the first data source broadcasting a first data stream across a first data channel, the first data stream being categorized by a topic subject;

detecting when the data receiver is located at a second receiver position, the second receiver position being outside the first data cell range and within the second data cell range; and subscribing the data receiver to a second data source when the data receiver is located at the second receiver position, the second data source broadcasting a second data stream across a second data channel, the second data stream having the same topic subject as the first data stream.

2. The method of claim 1, wherein detecting when the data receiver is located at the second receiver position further comprises acquiring location coordinates of the data receiver.

3. The method of claim 1, wherein detecting when the data receiver is located at the second receiver position further comprises comparing the second receiver position with the first data cell range.

4. The method of claim 3, wherein detecting when the data receiver is located at the second receiver position further comprises comparing the second receiver position with the second data cell range.

5. The method of claim 1, wherein subscribing the data receiver to the second data source further comprises opening the second data channel.

6. The method of claim 5, wherein subscribing the data receiver to the second data source further comprises coupling the data receiver with the second data stream.

7. The method of claim 1, wherein subscribing the data receiver to the second data source further comprises synchronizing the second data stream with the first data stream.

8. The method of claim 1, further comprising:
defining a data sub-cell range based on a geographic region; and
selectively filtering the second data stream when the data receiver is located within the data sub-cell range.

9. The method of claim 1, further comprising:
determining a probability distribution based on a position sample rate of the data receiver; and
preemptively opening the second data channel based on the probability distribution.

10. The method of claim 1, further comprising:
determining a probability distribution based on the data receiver velocity; and
preemptively opening the second data channel based on the probability distribution.

11. The method of claim 1, further comprising setting the second receiver position to a constant value.

12. The method of claim 1, further comprising adding a position offset to the first receiver position and the second receiver position.

13. A computer-readable medium having computer-executable instructions for performing the operations recited in claim 1.

14. A broadcast-based data dissemination system comprising:
a first data source having an associated first data cell range, an associated first signal broadcast range and an associated first data topic, the first data cell range being different than the first signal broadcast range, the first data source configured to broadcast a first data stream across a first data channel;
a data receiver having a current receiver position and subscribing to the first data source;
a second data source having an associated second data cell range, an associated second signal broadcast range and an associated second data topic matching the first data topic, the second data cell range being different than the second signal broadcast range, the second data source configured to broadcast a second data stream across a second data channel; and
a hand-off controller configured to subscribe the data receiver to the second data source if the current receiver position changes from the first data cell range to the second data cell range.

15. The broadcast-based data dissemination system of claim 14, further comprising a data channel proxy controller having a first input coupled to the first data stream, a second input coupled to the second data stream, and an output switchably coupled between the first input and the second input, the output being further coupled to the data receiver, the data channel proxy controller being configured to switch the output from the first input to the second input if the current receiver position changes from the first data cell range to the second data cell range.

16. The broadcast-based data dissemination system of claim 14, further comprising a speculative data channel controller configured to preemptively open the second data channel based on a probability distribution of a position sample rate of the data receiver.

17. The broadcast-based data dissemination system of claim 14, further comprising a speculative data channel controller configured to preemptively open the second data channel based on a probability distribution of the data receiver velocity.

18. The broadcast-based data dissemination system of claim 14, further comprising a data filter configured to selectively filter the second data stream when the data receiver is located within a data sub-cell range, the data sub-cell range being based on a third geographic region.

19. In a computer-readable medium having stored thereon a data structure for use in a hand-off process between data sources within a broadcast-based data dissemination environment, the data structure comprising:
a primary data source identifier field identifying at least one data source within the broadcast-based data dissemination environment, the data source including at least one base station having a signal broadcast range;
a data cell range field coupled to the primary data source identifier field, the data cell range field describing a geographical range of a data cell controlled by the data source, wherein the data cell range is different than the signal broadcast range; and
a communication link field coupled to the primary data source identifier field, the communication link field describing at least one data channel for receiving data streams from the data source.

20. The data structure of claim 19, further comprising a topics field, the topics field identifying data sources broadcasting data categorized by a common topic.

21. The data structure of claim 19, further comprising:
a data receiver identifier field identifying data receivers within the broadcast-based data dissemination environment;
a location information field coupled to the data receiver identifier field, the location information field describing geographical locations of the data receivers; and
a secondary data source identifier field coupled to the location information field, the secondary data source identifier field identifying data sources subscribed to by the data receivers.

22. A method for handing-off a data receiver to a data source in a broadcast-based data dissemination environment, the data receiver having a current receiver location and receiving a current data stream from a current data source, the current data source having a current topic and a current data cell range, the current data cell range being defined by a geographic region, the method comprising:
acquiring the current receiver location of the data receiver;
comparing the current receiver location with the current data cell range; and
if the current receiver location is outside the current data cell range:
searching for a new data source having an associated new data cell range encompassing the current receiver location and an associated data topic matching the current topic, the new data source including at least one base station having a signal broadcast range that is different than the new data cell range, wherein the new data source broadcasts a new data stream across a new data channel; and subscribing the data receiver to the new data source.

23. The method of claim 22, wherein subscribing the data receiver to the new data source further comprises opening the new data channel.

24. The method of claim 22, wherein searching for a new data source further comprises comparing the current receiver location with the new data cell range.

25. The method of claim 22, wherein subscribing the data receiver to the new data source further comprises coupling the data receiver with the new data stream.

26. The method of claim 22, wherein subscribing the data receiver to the new data source further comprises synchronizing the new data stream with the current data stream.

27. The method of claim 22, further comprising:
determining a probability distribution based on a position sample rate of the data receiver; and
preemptively opening the new data channel based on the probability distribution.

28. The method of claim 22, further comprising:
determining a probability distribution based on the data receiver velocity; and
preemptively opening the new data channel based on the probability distribution.

29. The method of claim 22, further comprising adding a position offset to the current receiver location.

30. A computer-readable medium having computer-executable instructions for performing the operations recited in claim 22.

31. A data receiver configured to present a data stream from a data source in a broadcast-based data dissemination environment to a user, the data receiver comprising:
a position sensor configured to sense a current geographical location of the data receiver;
a broadcast receiver configured to receive a current data stream from a current data source, the current data source having a current topic and a current data cell range, the current data cell range being defined by a current geographic region;
a data source table identifying data sources, data cell ranges, and data channels within the broadcast-based data dissemination environment; and
a hand-off controller configured to subscribe the data receiver to a new data source listed in the data source table if the current geographical location of the data receiver is outside the current data cell range, the new data source having an associated new data cell range encompassing the current geographical location of the data receiver and an associated data topic matching the current topic, the new data source including at least one base station having a signal broadcast range different than the new data cell range.

32. The data receiver of claim 31, further comprising a topics table identifying data sources within the broadcast-based data dissemination environment broadcasting data streams with a common topic.

33. The data receiver of claim 31, further comprising a speculative data channel controller configured to preemptively open the second data channel based on a position sample rate of the data receiver.

34. The data receiver of claim 31, further comprising an output device configured to communicate the current data stream to the user.

35. The data receiver of claim 34, further comprising a data channel proxy controller configured to couple the new data stream to the output device if the current geographical location of the data receiver is outside the current data cell range and within the new data cell range.

36. The data receiver of claim 31, further comprising a data filter configured to selectively filter the current data stream when the current geographical location of the data receiver is within a data sub-cell range, the data sub-cell range being based on a sub-cell geographic region.

* * * * *